United States Patent [19]

D'Atre et al.

[11] 4,420,719
[45] Dec. 13, 1983

[54] CROSS-TIED CURRENT REGULATOR FOR LOAD COMMUTATED INVERTER DRIVES

[75] Inventors: John D. D'Atre, Saratoga, N.Y.; Loren H. Walker, Salem, Va.

[73] Assignee: General Electric Company, Salem, Va.

[21] Appl. No.: 333,929

[22] Filed: Dec. 23, 1981

[51] Int. Cl.³ .............................................. H02P 5/40
[52] U.S. Cl. ................................. 318/803; 318/809; 318/723
[58] Field of Search ........ 318/803, 805, 798, 807–811, 318/721, 722, 723

[56] References Cited

U.S. PATENT DOCUMENTS

| 3,372,323 | 3/1968 | Guxeska | 318/803 |
| 3,769,564 | 10/1973 | Rettig | 318/803 |
| 4,230,979 | 10/1980 | Espelage et al. | 318/721 |
| 4,276,505 | 6/1981 | Bose | 318/723 |

OTHER PUBLICATIONS

Maag, R. B., "Characteristics and Application of Current Source/Slip Regulated AC Induction Motor Drives", IEEE-IGA Annual Meeting, Cleveland, Ohio, Oct. 18–21, 1971, pp. 1–6.
Phillips, K. P., "Current Source Convertor for AC Motor Drives", IEEE Conference Record, IEEE-IGA Annual Meeting, Cleveland, Ohio, Oct. 18–Oct. 21, 1971, pp. 385–391.
"Utilization and Rating of Machine Commutated Inverter-Synchronous Motor Drives", by J. Rosa, IEEE-IAS Conference Record, 1978, pp. 453–462.

*Primary Examiner*—David Smith, Jr.
*Attorney, Agent, or Firm*—Arnold E. Renner; Ormand R. Austin

[57] ABSTRACT

A control system for an AC motor drive including a source side converter and a load side converter coupled together by means of a DC link circuit wherein the current in the DC link circuit is controlled by either the source side converter or load side converter depending upon which converter is capable of control. This is achieved by crosstieing a signal from the normal regulating path in the source side converter control to the alternate regulating path in the load side converter control. This signal is chosen to be indicative of the source side converter controller being unable to control current, and may be derived from current error. This signal operates to alter the firing angle of the load side thyristor bridge to regulate the DC link current in the event the source side converter is unable to maintain the required current regulation.

26 Claims, 6 Drawing Figures

CROSS-TIED CURRENT REGULATOR FOR LOAD COMMUTATED INVERTER DRIVES

REFERENCED MATERIAL

Reference is made to a microfiche appendix which sets forth a computer program listing including that which is applicable to the present invention. Included are 8 microfiche containing a total of 458 frames.

CROSS REFERENCE TO RELATED APPLICATIONS

This application is related to the following related applications which are assigned to the assignee of the present invention and are meant to be incorporated herein by reference: U.S. Ser. No. 6/322,741, entitled "Terminal Voltage Limit Regulator For A Load Commutated Inverter", filed on Nov. 19, 1981 in the name of L. C. Tupper; U.S. Ser. No. 6/333,933, "Flux Feedback For Firing Control For A Load Commutated Inverter", filed on Dec. 23, 1981 in the names of D. L. Lippitt, et al.; and U.S. Ser. No. 6/300,200, "Line to Line Voltage Reconstruction For Synchronizing Thyristor Power Converter", filed on Sept. 8, 1981 in the name of Paul M. Espelage.

BACKGROUND OF THE INVENTION

The present invention relates generally to power conversion systems and more particularly to a system for controlling the current supplied to a synchronous machine such as an AC motor from a polyphase alternating current source.

Many circuits and systems are known for controlling the conductivity of controlled rectifiers utilized in various types of converters for supplying electrical power to a load such as an AC motor, from a polyphase alternating current (AC) source. The type of rectifier used controls to some degree the type of control utilized, but by far the most common controlled rectifier in use today is a thyristor of the silicon controlled rectifier type which becomes conductive with the simultaneous application of a forward bias voltage and a signal applied to a gate electrode and which thereafter remains conductive until the anode current falls below the value required to hold the thyristor in the conductive state.

In U.S. Pat. No. 4,230,979, entitled, "Controlled Current Inverter And Motor Control System", Paul M. Espelage, et al. which issued on Oct. 28, 1980, there is disclosed a system which forms the basis of an AC motor drive for furnishing a synchronous motor with a variable frequency, variable magnitude AC current from a thyristor controlled load side converter or inverter which is supplied from a thyristor controlled source or line side converter by way of a direct current (DC) link including an inductor. Means are included to develop signals representing the instantaneous electrical torque of the AC motor and the instantaneous air gap power factor from which electrical control signals drive the line side converter to control the DC current in the link while the firing angle of the inverter is driven with respect to the motor flux such that the angle is maintained substantially constant over its prescribed operating range.

With respect to a load commutated inverter for a three phase (3$\phi$) AC motor drive, a typical example of which is shown and described in U.S. Pat. No. 4,276,505, entitled, "Microcomputer Based Control Apparatus For A Load-Commutated Inverter Synchronous Machine And Drive System", Bimal K. Bose, June 30, 1981, control of the inverter supplying the synchronous motor is normally based upon a thyristor firing strategy wherein the firing of the thyristors is provided at or near the commutation limit point, i.e. at a power factor angle just sufficiently leading to provide the necessary volt-seconds necessary to safely commutate the current transfer from one thyristor to the other of the thyristor bridge implementing the inverter. The Bose patent, moreover, discloses a control system which is implemented by digital techniques including a microcomputer having software programs which comprise coded instructional sets for effecting the necessary control routines from the sensed operational parameters. Both the Bose patent and the Espelage, et al. patent are specifically intended to be incorporated herein by reference for better enabling one skilled in the art to understand the present invention without necessity of the disclosure of extraneous and irrelevant material.

In load commutated inverter drives such as noted above, the basic operation is such that the line side power converter is controlled to regulate motor current through the DC link circuit while the load side converter is commanded to produce motoring or braking torque, with both of these control channels being responsive to a signal generated by a speed control regulator. The control of such a system, however, is lost whenever the line side converter is unable to maintain control of the DC link current which can happen in a number of ways. For example, when a line disturbance occurs on the polyphase AC input line, the value of the line voltage dips. In some instances the dip can be large enough to cause a reduction in the line side DC voltage which appears at the output of the line side converter and one side of the link circuit while the DC voltage at the input side of the load converter and the other side of the link circuit is larger than that capable from the line side converter. In such a condition, in a motoring mode the current in the link circuit will be reduced to zero. Even though the line side converter senses this condition, it cannot drive the current into the load side converter. In a braking mode while the opposite situation exists, control is also lost with current larger, rather than smaller than desired.

Another condition can exist where control is lost at high speed under a no load condition of the motor. There the motor voltage which exists on the line between the motor and the load side converter rises to the extent that it can exceed the AC line voltage. In such a situation, the line side converter is unable to generate a DC voltage which is greater than the load voltage when motoring is again required, causing current to fall in the DC link to zero and control to be lost.

One known solution to the aforementioned control problem is to oversize the line voltage by as much as 20 to 30% above that of the unloaded motor at top speed. This acts to lessen the occurrence where the DC voltage into the load side converter is greater than the voltage at the output of the line side converter, but lessens the capability of the line side converter and provides an inherent undesirable limitation on system operation, efficiency, and line power factor.

SUMMARY OF THE INVENTION

It is therefore an object of the present invention to provide an improvement in polyphase power converter system control.

It is a further object to provide an improvement in polyphase power converter system control for a synchronous motor.

It is still a further object of the present invention to provide an improvement in a polyphase power converter system for controlling a load commutated inverter AC motor drive.

The foregoing and other objects are achieved in accordance with the present invention with the provision of an improved motor drive system comprised of a line side AC to DC power converter connected to a load side DC to AC power converter by means of a DC link circuit. Through the establishment of a torque reference signal, a current reference signal and a firing angle signal are generated to control, respectively, under normal conditions the DC current in the link circuit and the firing angle of the load side converter. Under certain conditions, however, control of current in the DC link circuit is switched from the source side converter to the load side converter, depending upon the converter which is capable of regulating it. This is achieved by cross tieing a signal derived from current error. Said current error is derived from a comparison of current reference signal and a signal corresponding to motor current. Said cross-tie signal is generated in the source side control when current error exceeds a predetermined level. The cross-tie signal consists of the amount by which the current error exceeds this predetermined level. The effect of the cross-tie signal on the load side control is to modify the load side firing angle in a manner to regulate link current at or near the current reference level.

BRIEF DESCRIPTION OF THE DRAWINGS

While the present invention is described in particularity in the claims annexed to and forming part of this specification, a better understanding of the invention can be had by reference to the following description taken in conjunction with the accompanying drawings in which:

DESCRIPTION OF THE PREFERRED EMBODIMENTS

Figure 1:
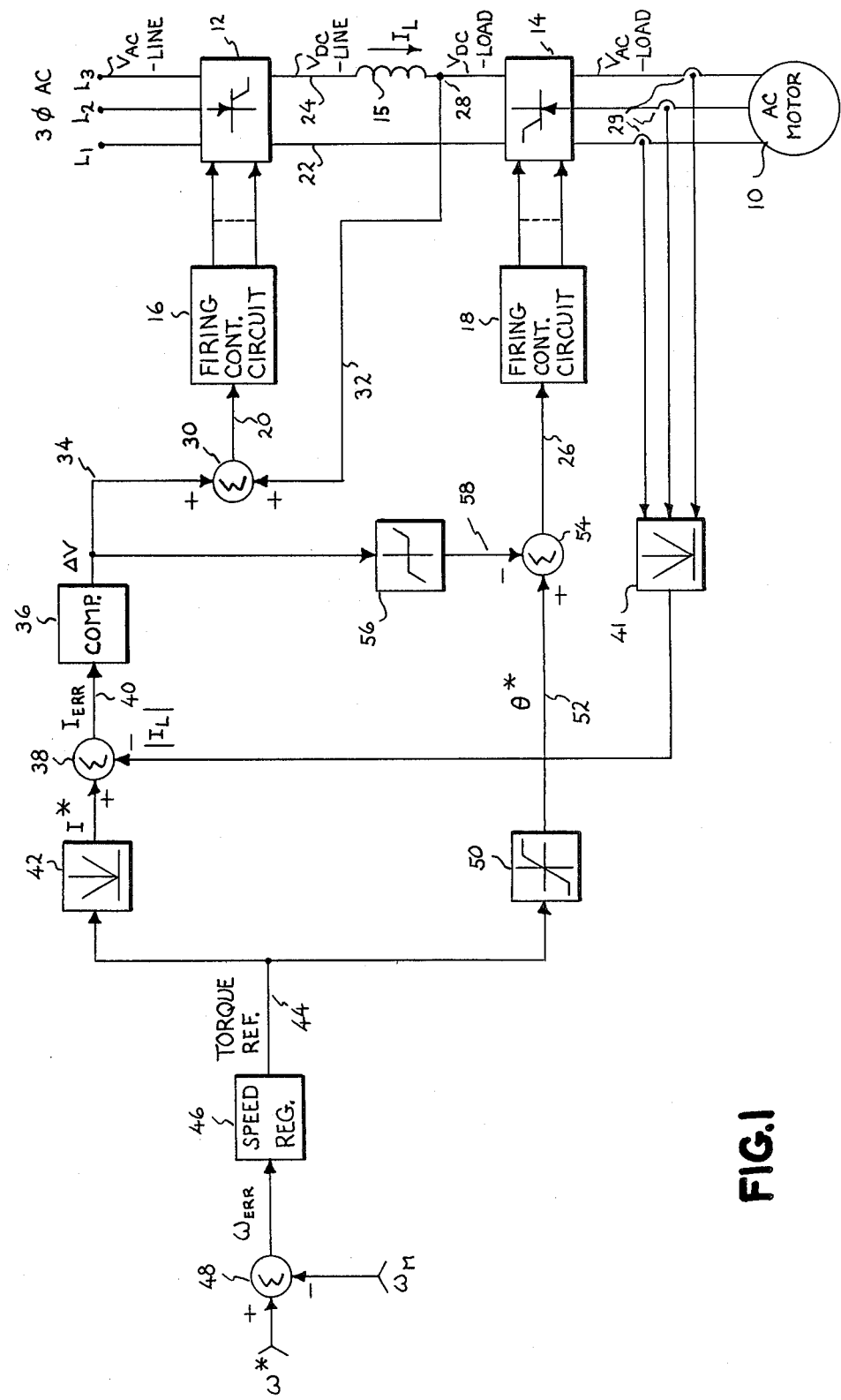
FIG. 1 is an electrical block diagram illustrative of an AC motor drive system incorporating the present invention.

Referring now to FIG. 1, there is illustrated in block diagram form an AC motor drive system for controlling an AC motor load 10, and more particularly a synchronous motor, from a three phase (3φ) alternating current power source represented by line terminals $L_1$, $L_2$ and $L_3$ in accordance with the operation of an AC to DC source side converter 12 and a DC to AC load side converter 14, also referred to as an inverter. The source side converter 12 operates to convert the three phase AC power into a source of variable DC current which is coupled by way of a DC link circuit including an inductor 16 to the converter 14.

The two converters 12 and 14 are comprised of phase controlled multi-leg thyristor bridge circuits which are controlled by means of firing circuits 16 and 18. The firing circuit 16 operates in response to a signal appearing on lead 20 while the firing circuit 18 operates in response to a signal appearing on circuit lead 26.

A feedback path from the inverter input voltage $V_{DC-LOAD}$ appearing at circuit node 28 is coupled, via lead 32, to a first summing junction 30. The signal appearing on circuit lead 32 is a positive feedback of unity gain. Ignoring for the moment any other inputs to the summing junction 30, this feedback will cause the output voltage $V_{DC-LINE}$ to match that reflected by the converter 14. With no DC voltage across the inductor 16, the inductor will tend to maintain a constant current $I_L$ at any voltage level set by $V_{DC-LOAD}$. If a second signal $\Delta V$ is injected into the summing junction 30 such as by way of input lead 34, the result will be a change in the voltage across the inductor 16 which is proportional to the signal $\Delta V$. This then will cause a rate of change of current $I_L$ in the inductor which is proportional to the signal on lead 34. Thus the positive feedback signal through the signal lead 32 acts to convert the converter 12 into a variable DC current source responsive to an input signal appearing on line 34.

As further shown in FIG. 1, the signal $\Delta V$ constitutes the output of a suitable compensation circuit 36 which may exhibit a well known transfer function typically of the type $[K(1+St)]/S$ where K is a constant, t is a time constant and S is the Laplace transform operator. The input of the circuit 36 is coupled to a second summing junction 38 which is adapted to provide a current error signal $I_{ERR}$ on circuit lead 40 which constitutes the difference between a current reference signal I* and the absolute value $|I_L|$ of the motor current. The $|I_L|$ signal is shown, for illustrative purposes, being generated by an absolute magnitude circuit 41 coupled to current sensors 29. The desired current I* is generated in an absolute magnitude circuit 42 which is responsive to a torque reference signal appearing on circuit lead 44 from a speed regulator circuit 46. The speed regulator generates the torque reference signal in response to a speed error signal $\omega_{ERR}$ which is provided at the summing junction 48 having inputs corresponding to the desired speed (as from some operator input, not shown) and the actual motor speed $\omega_m$. The $\omega_m$ signal may be obtained from any suitable source such as a tachometer, not shown.

The torque reference signal appearing on circuit lead 44 is additionally coupled to a limiting circuit 50 which provides an output signal which is essentially of constant magnitude but of varying polarity in accordance with the polarity of the torque reference signal. The output of the limiter 50 comprises an angle reference signal θ* which is coupled by means of circuit lead 52 to the summing junction 54 for controlling the firing control circuit 18 in a well known manner. The system up to this point includes the same basic power components as set forth in the aforementioned Espelage U.S. Pat. No. 4,230,979. The basic operation of such a system is such that the line side power converter 12 is controlled to regulate the motor current $I_L$ while the load side converter 14 is commanded to produce motoring or braking torque, both being under the control of the speed regulator 46.

The present invention as shown in FIG. 1 further contemplates the inclusion of cross-tie circuit means 56 coupled between the output of the compensator circuit 36 and a summing junction 54. The circuit means 56 is a level sensing circuit and operates such that no output appears on circuit lead 58 until the amplitude of the signal $\Delta V$ reaches a certain value, at which time a signal proportional to the further increase of $\Delta V$ is coupled to the summing junction 54. In normal operation, where the line side converter 12 is regulating the current $I_L$, the signal $\Delta V$ is relatively small and changes of current level are effected by changes in the line side converter firing angle by means of the firing circuit 16. The load side converter firing angle is normally fixed in response to the output of the limiter circuit 50 for motoring or braking in response to the speed regulator circuit 46. In the event that the converter 12 is unable to maintain the current $I_L$ at its required level, the signal on circuit lead 40 as well as the output of the compensation circuit $\Delta V$ will increase and after reaching a predetermined magnitude, will spill over to circuit junction 54 by operation of the circuit 56. The magnitude of the signal on circuit lead 58 is subtracted from the $\theta^*$ signal on lead 52 and causes a decrease of signal on circuit lead 26 which alters the firing angle of the load side converter 14 which in turn acts to regulate the current $I_L$ in the load. When the line side converter 12 again regains current regulation capability, the signal $\Delta V$ will reduce to a level where no signal appears on circuit lead 58 at which time the load side converter 14 will again respond only to the output of the speed regulator circuit 46. Note that the input to circuit block 56 could be taken from leads 40, 34 or 20 with suitable adjustment of the predetermined level in spillover circuit 56.

Figure 2:
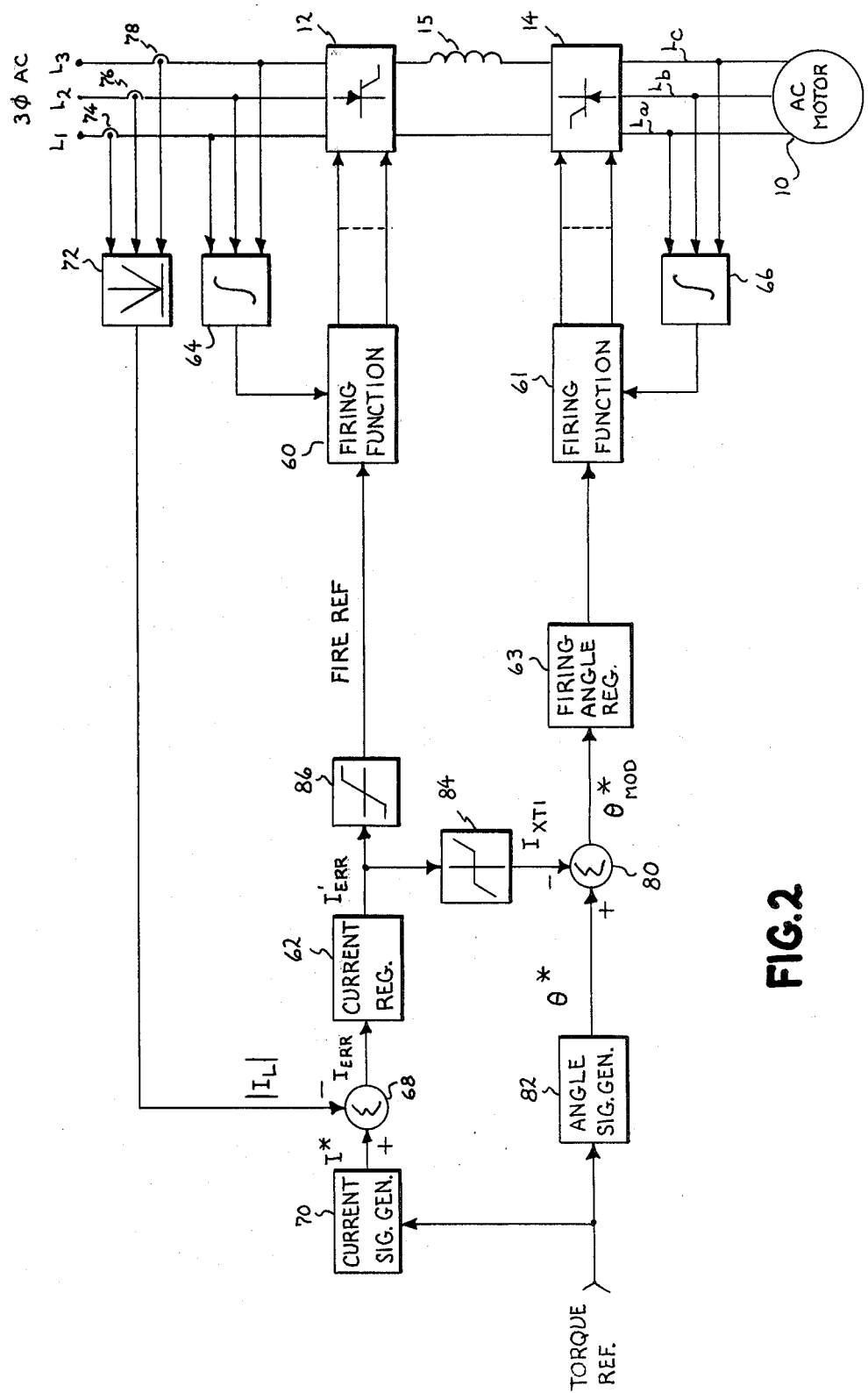
FIG. 2 is an electrical block diagram illustrative of yet another embodiment of an AC motor drive system incorporating the invention.

Referring now to FIG. 2, there is disclosed a modification of the embodiment shown in FIG. 1 in that it discloses a system wherein the converters 12 and 14 are controlled by means of digital fire control functions 60 and 61 wherein thyristor bridges in the respective converters are primarily controlled by the output of a current regulator 62 and a firing angle regulator 63. Moreover, the firing of the thyristors in the two converters 12 and 14 is synchronized with respect to the line voltages $L_1$, $L_2$, $L_3$ and $L_a$, $L_b$, $L_c$ by means of suitable integration circuitry 64 and 66 typically of the type shown and described in the above cross referenced application, U.S. Ser. No. 6/300,200 entitled, "Line To Line Voltage Reconstruction For Synchronizing Thyristor Power Converter". The load side converter or inverter 14, moreover, is meant to comprise a load commutated inverter which is adapted to be controlled by reference to pseudo flux waves generated by the circuit means 66 as taught by the above cross referenced application U.S. Ser. No. 6/339,933, entitled "Flux Feedback For Firing Control Of A Load Commutated Inverter".

A current regulator 62 operates in response to a current error signal $I_{ERR}$ which is produced at a summing junction 68 and, as before, comprises the difference between the values of the current reference signal $I^*$ and the signal $|I_L|$ which corresponds to the load or motor current being drawn by the motor 10. The current reference signal $I^*$ is provided by a current signal generator 70 whose input signal comprises the torque reference signal which is provided, for example, by the speed regulator circuit 46 shown in FIG. 1. The value of the load current $I_L$ is provided by an absolute magnitude circuit 73 which is shown coupled to the $3\phi$ AC input lines $L_1$, $L_2$ and $L_3$ by the current sensors 74, 76 and 78.

The input of the firing angle regulator circuit 63, shown in FIG. 2, is coupled to a summing junction 80 which is operable to provide the difference between the angle reference signal $\theta^*$, provided by an angle signal generator circuit 82 coupled to the torque reference signal, and a spill-over or cross-tie signal $I_{XTI}$ provided by a cross-tie circuit 84, the latter being adapted to function in the same fashion as circuit 56 shown in FIG. 1 in that an increase of the current error signal $I'_{ERR}$ at the output of the current regulator 62 beyond a predetermined value causes a signal to be coupled to the summing junction 80 which causes a modified angle error signal $\theta^*_{MOD}$ to be coupled to the firing angle regulator 63 which will cause the firing function 61 to alter the firing angle of the load side converter 14 in such a fashion as to regulate the current $I_L$. The point at which the cross-tie circuit 84 produces a cross-tie signal $I_{XTI}$ is determined to be at the point where the magnitude of signal $I'_{ERR}$ indicates that the line side converter 12 is no longer capable of regulating the current in the DC link circuit including the inductor 16.

Limiter circuit block 86 between the current regulator 62 and the firing function block 60 may be set to clamp the signal $I'_{ERR}$ at the same points at which spillover circuit block 84 begins to pass a signal. This causes the current regulator to affect either the source side converter or the load side converter but not both simultaneously.

Figure 3:
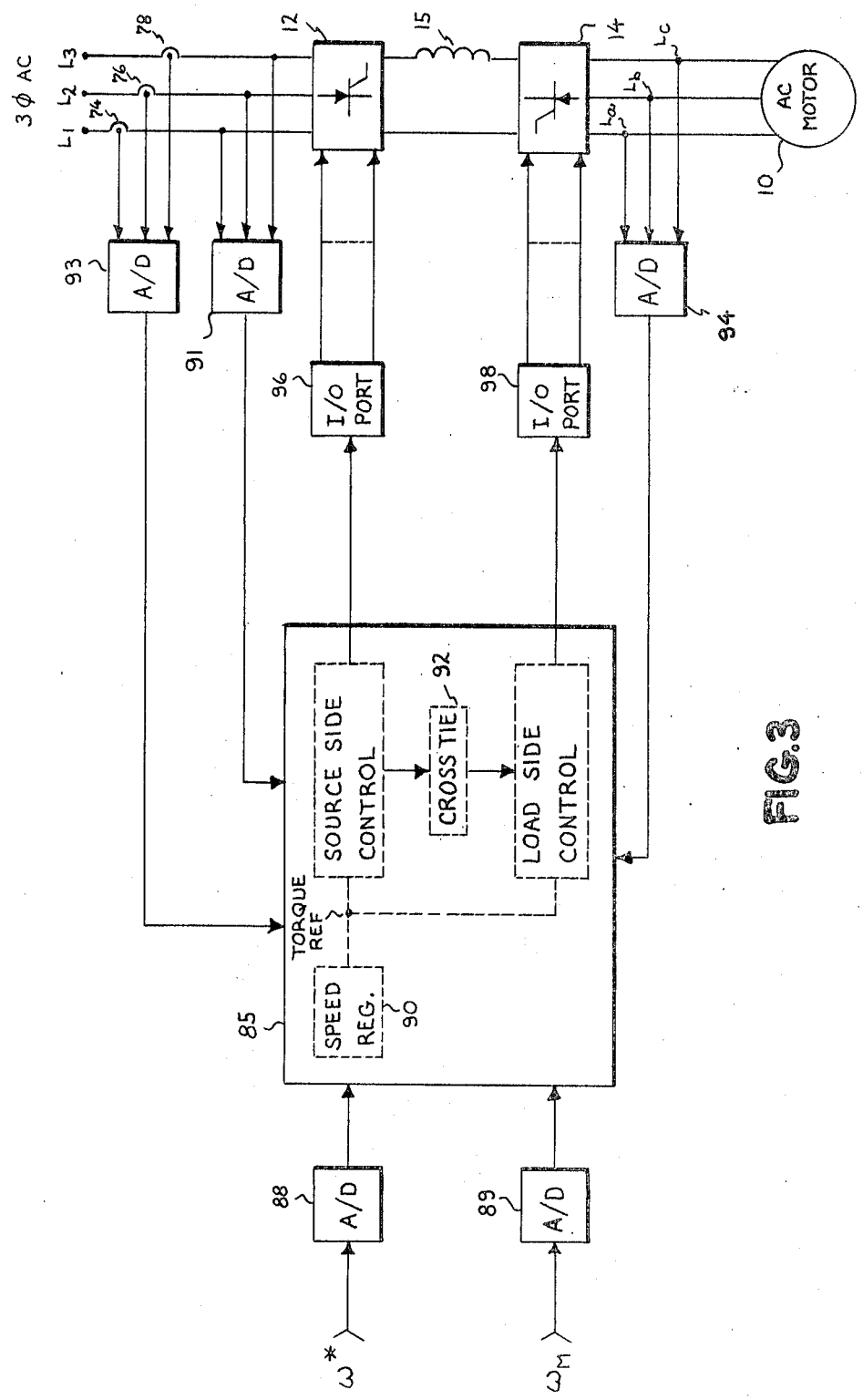
FIG. 3 is a block diagram illustrating the implementation of the present invention using a microprocessor.

While the two embodiments shown in FIGS. 1 and 2 are illustrative of the use of discrete hardware functional elements, the implementation of the functional blocks 60, 61, 62, 63, 68, 70, 80, 82, 84 and 86 is preferably accomplished by digital computer apparatus. Accordingly, FIG. 3 is a block diagram illustrative of the basic implementation of the present invention using a microprocessor. As shown, a speed reference signal $\omega^*$ and a speed feedback signal $\omega_M$ are furnished from suitable sources such as described with respect to FIG. 1, to a microprocessor 85 by way of analog to digital converters 88 and 89. If the speed reference and feedback signals were originally presented in digital form, the A/D converters would not be necessary. The microprocessor employed in the present invention may be of any of those suitable for control applications, but in actual practice comprises two Intel 8086 processors programmed in PLM86 language, one controlling the source converter and one controlling the load converter. As part of their functions, the microprocessors 85 generate the torque reference signal of FIG. 2 using a speed regulator software routine as indicated by dashed line block 90. The spill-over or cross-tie signal is shown in FIG. 3 as being derived from a cross-tie software routine shown by the dashed line block 92. The microprocessor 85 receives inputs from and provides outputs to the power circuitry which is substantially identical to that illustrated in FIG. 2, that is, the power lines $L_1$, $L_2$ and $L_3$ supply a source side converter 12 which is connected to a load side converter 14 by way of a DC link circuit including an inductor 15. The load side converter furnishes power to the motor 10 by way of lines $L_a$, $L_b$ and $L_c$. Synchronization information for the source side converter 12 is furnished by a suitable A/D converter 91 which is connected to lines $L_1$, $L_2$ and $L_3$. The current feedback loop indicative of the load current $I_L$ includes an A/D converter 93 connected to the current sensors 74, 76 and 78. Connected to the lines $L_a$, $L_b$ and $L_c$ is an additional A/D converter 94 which provides the microprocessors 85 with synchronization and commutation information for the load side converter 14. The microprocessors 85 utilize these various input signals in a functional manner described with respect to FIG. 2 and provide suitable outputs to control the thyristor firing of the converters 12 and 14. In FIG. 3 this is illustrated as outputs provided respectively to two I/O ports 96 and 98 which additionally include the necessary interface circuitry to provide the necessary firing signals to the converters 12 and 14.

Figure 4:
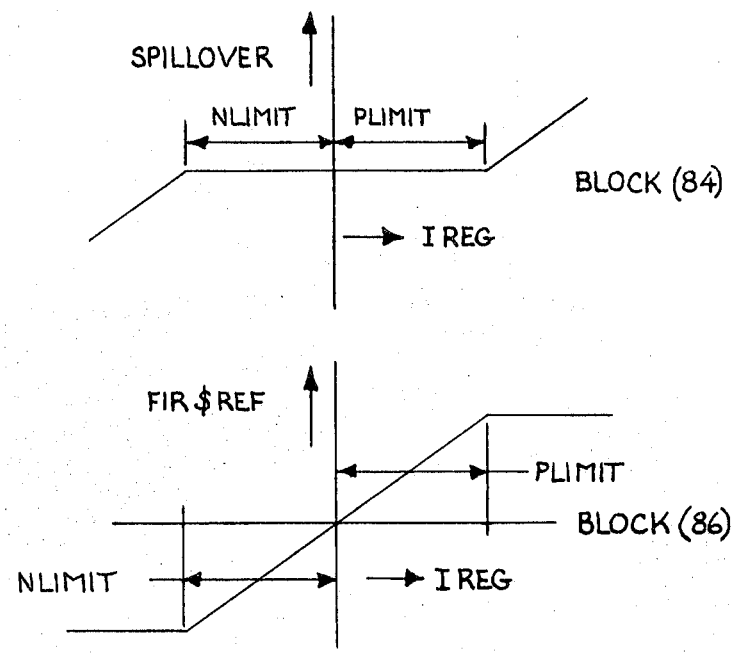
FIG. 4 defines functions of non-linear blocks in FIG. 2.
Figure 6:
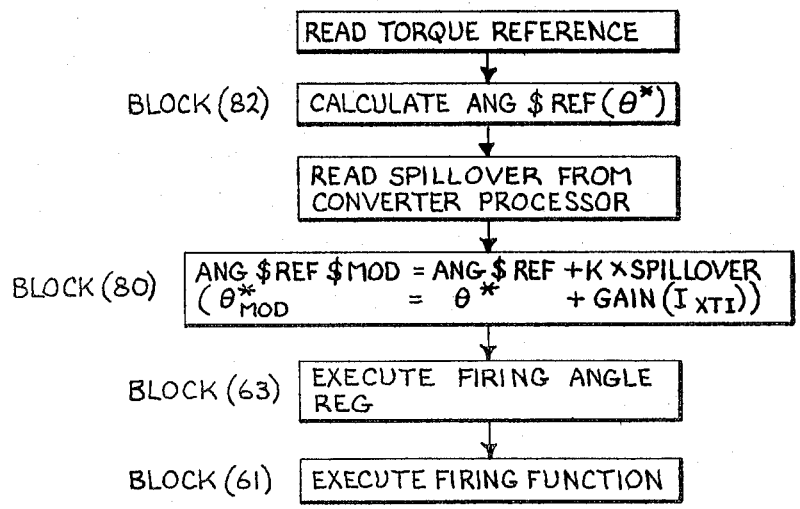
FIG. 6 is a flow chart illustrative of the software for implementing the load side portion of the cross-tie regulator function according to the subject invention.
Figure 5:
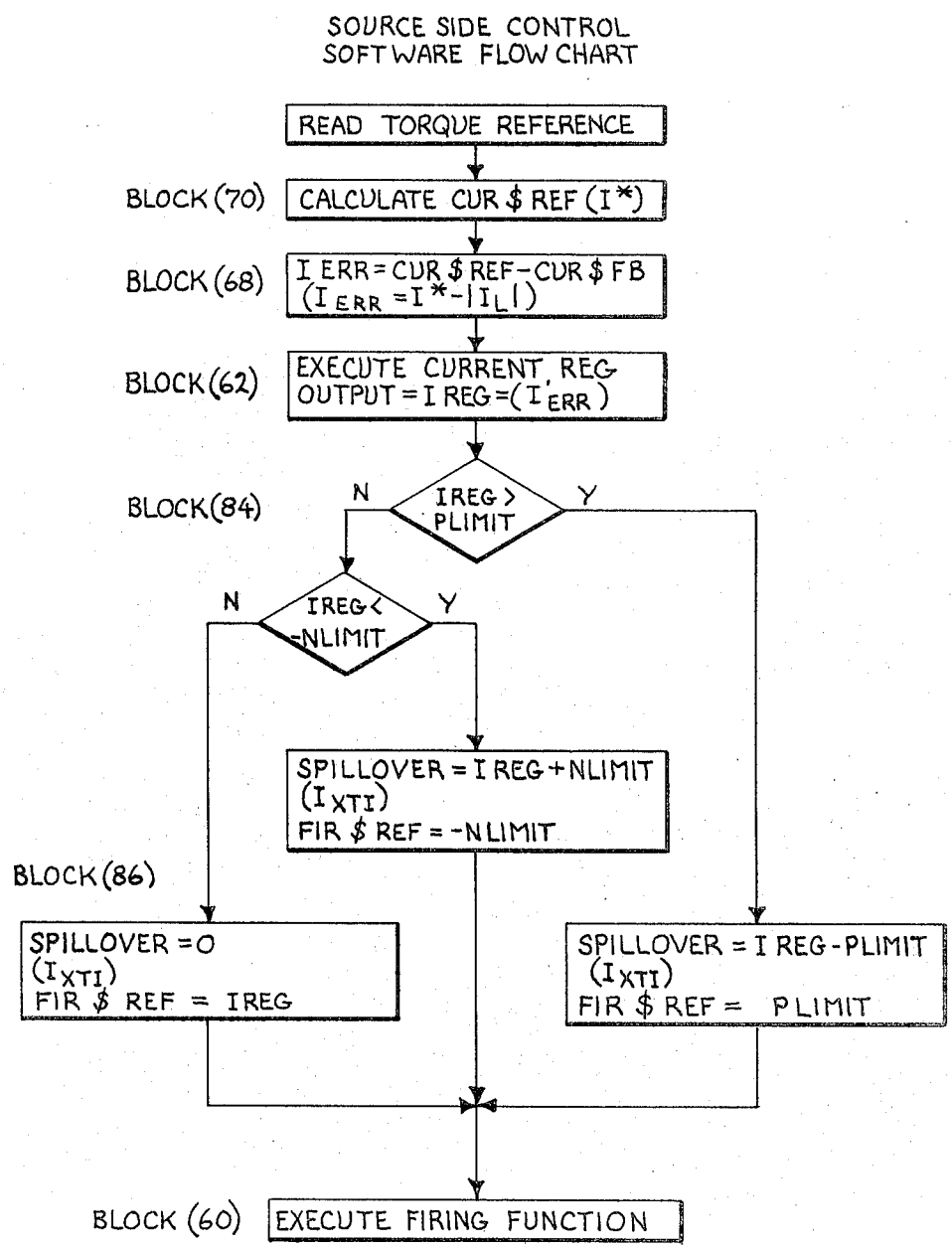
FIG. 5 is a flow chart illustrative of the software for implementing the source side portion of the cross-tie regulator function according to the subject invention.

The software implementing the invention in the microprocessor is represented in FIGS. 4, 5 and 6. FIG. 4 provides details of the nonlinear function spillover 84 and clamp 86, defining the software terminology. FIGS. 5 and 6 represent the source side and load side control software in the form of flow charts, related specifically to the block diagram of FIG. 2. Terminology is defined by reference (in parentheses) to the exact terminology of FIG. 2.

FIG. 5 shows a flow chart representing blocks 60, 62, 68, 70, 84, 86 in the microprocessor controlling the source side converter. FIG. 6 shows the flow chart representing the software implementing blocks 61, 63, 80 and 82 in the microprocessor controlling the load side converter.

In these flow charts the torque reference signal may be generated by a speed regulator function in either processor or may be input to both processors from an external source as shown in FIG. 2. The cross-tie function between the two processors is accomplished by the passing of signal spillover ($I_{XTI}$) from the source control processor to the load control processor.

While there has been shown and described what are at present considered to be the preferred embodiments of the present invention, modifications thereto will readily occur to those skilled in the art. It is not desired, therefore, that the invention be limited to the specific methods and logic structure shown and described, but it is intended to cover all such modifications, changes and alterations as fall within the true spirit and scope of the invention as defined in the appended claims.

We claim:

1. A method of controlling an AC load in response to an operational control signal by means of a source side converter coupled from an AC source to a load side converter via a DC link and wherein said load side converter supplies power to said load, comprising the steps of:
   (a) generating first and second reference signals from said operational control signal;
   (b) sensing an operational parameter of the load;
   (c) comparing the first reference signal against the operational parameter of the load in a first signal channel and generating an error signal for controlling the source side converter;
   (d) normally controlling the load side converter in response to said second reference signal applied via a second signal channel;
   (e) sensing the value of said error signal or a value derived therefrom and in the event said value exceeds a predetermined value thereafter providing a third signal while said value exceeds said predetermined value;
   (f) cross coupling said third signal from said first signal channel to said second signal channel and combining said third signal with said second reference signal; and
   (g) from step (f) generating a modified command signal to control said load side converter until said value no longer exceeds said predetermined value and said second reference signal again resumes normal control of said load side converter.

2. The method as defined in claim 1 wherein said third signal is generated by detecting a limit condition in said first signal channel.

3. The method as defined by claim 1 wherein the load comprises an AC motor.

4. The method as defined by claim 1 wherein said operational parameter is current supplied to the load.

5. A method of controlling an AC motor load in response to an operational control signal by means of an AC to DC thyristor converter coupled from an AC source to a DC to AC thyristor converter via a DC link circuit and wherein said DC to AC converter supplies power to said motor load, comprising the steps of:
   (a) generating a current reference and an angle reference signal from said operational control signal;
   (b) sensing the motor load current;
   (c) comparing the current reference signal against the motor load current and in a first signal channel generating a current error signal for controlling the AC to DC converter;
   (d) controlling the DC to AC converter in response to said angle reference signal;
   (e) sensing the value of said error signal and in the event said error signal, or a function thereof, exceeds a predetermined value, generating a cross-tie spillover signal;
   (f) combining said cross-tie spillover signal with said angle reference signal; and
   (g) from said combining step (f) generating a modified angle reference signal for thereafter controlling said DC to AC converter until said value no longer exceeds said predetermined value.

6. The method as defined by claim 5 wherein said operational control signal comprises a torque reference signal.

7. The method as defined by claim 5 wherein said spillover signal is generated by detecting a limit condition in said first signal channel.

8. The method as defined by claim 5 wherein controlling said AC to DC converter normally comprises controlling the motor load current by changing the current in said DC link circuit.

9. The method as defined by claim 8 wherein said cross-tie spillover signal is produced in response to an error in motor load current indicating that the AC to DC converter cannot regulate the current in said DC link circuit and said modified angle reference signal thereafter causes said DC to AC converter to regulate said current.

10. The method as defined by claim 5 wherein said step (c) of comparing comprises differencing the current reference signal and the motor load current.

11. The method as defined by claim 5 wherein said step (f) of combining comprises combining the angle reference signal and the cross-tie spillover signal.

12. The method as defined by claim 5 and additionally including the steps of:
   (h) synchronizing the firing of said AC to DC thyristor converter to at least one integrated line voltage of said AC source; and (i) synchronizing the firing of said DC to AC converter to at least one integrated line voltage of said AC motor load.

13. The method as defined by claim 5 wherein said AC motor load comprises a 3φ synchronous motor and additionally including the step of timing the firing of said thyristor converters by flux waves derived from at least one line voltage and one load voltage.

14. Apparatus for controlling an AC motor drive system supplying power of a variable current magnitude and frequency to a synchronous motor in response to a desired motor speed, comprising:
   (a) means for providing a controlled variable DC current source for providing a DC output which varies in magnitude in response to a first control signal applied thereto;
   (b) means for providing a controlled variable AC current source for providing an AC current which varies in frequency to said motor in response to a second control signal applied thereto;
   (c) DC link circuit means connecting said DC current source to said AC current source;
   (d) means generating first and second reference signals in response to the desired motor speed;
   (e) means for detecting the magnitude of the motor current and generating a motor current signal;
   (f) means for comparing said first reference signal with said motor current signal to provide an error signal from which is generated said first control signal;
   (g) means for detecting the magnitude of said first control signal and providing an output signal corresponding to the magnitude of said first control signal over a predetermined value; and
   (h) means for combining said output signal provided by means (g) with said second control signal to provide a modified control signal for said variable AC current source whereby motor current regulation is shifted from said variable DC current source to said variable AC current source.

15. The apparatus as defined by claim 14 wherein said output signal is generated by detecting a limit condition in the control of said DC current source.

16. The apparatus as defined by claim 14 wherein said variable DC current source comprises an AC to DC thyristor converter.

17. The apparatus as defined by claim 16 and wherein said variable AC current source comprises a DC to AC converter.

18. The apparatus as defined by claim 17 where said load side converter comprises a load commutated inverter.

19. The apparatus as defined by claim 14 wherein said variable DC current source includes an AC to DC thyristor converter coupled to a polyphase AC source.

20. The apparatus as defined by claim 19 and wherein said variable current source includes a DC to AC thyristor converter coupled to a polyphase AC motor.

21. The apparatus as defined by claim 20 wherein said polyphase source comprises a three phase source and said AC motor comprises a three phase motor.

22. The apparatus as defined by claim 20 wherein said variable DC current source and said variable AC current source additionally include first and second means for respectively controlling the thyristor firing of said AC to DC converter and said DC to AC converter.

23. The apparatus as defined by claim 22 wherein said first reference signal comprises a current reference signal and said second reference signal comprises an angle reference signal.

24. The apparatus as defined by claim 23 wherein said current reference signal controls the thyristor firing angles of said AC to DC converter and wherein said angle reference signal controls the thyristor firing angles of said DC to AC converter.

25. The apparatus as defined by claim 24 wherein said output signal from the means (g) comprises a cross-tie signal for modifying said angle reference signal in the event the motor current deviates from its commanded value indicating that said AC to DC converter cannot control the current in said DC link circuit means (c), said angle reference signal when modified operating to vary the thyristor firing angle of said DC to AC converter in a direction to control said DC link current.

26. The apparatus as defined by claim 25 wherein said first and second means comprise phase locked control loops synchronized to the integrated line voltages, respectively of said AC source and said AC motor.

* * * * *